(12) United States Patent
Lee

(10) Patent No.: US 7,394,787 B2
(45) Date of Patent: Jul. 1, 2008

(54) METHOD AND SYSTEM FOR PREVENTING CALL DROP BY RESTRICTING OVERHEAD MESSAGE UPDATED IN 1X SYSTEM DURING 1XEV-DO TRAFFIC STATE

(75) Inventor: Jonghun Lee, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 276 days.

(21) Appl. No.: 10/541,252

(22) PCT Filed: Dec. 12, 2003

(86) PCT No.: PCT/KR03/02720

§ 371 (c)(1),
(2), (4) Date: Apr. 24, 2006

(87) PCT Pub. No.: WO2004/060013

PCT Pub. Date: Jul. 15, 2004

(65) Prior Publication Data

US 2006/0246885 A1 Nov. 2, 2006

(30) Foreign Application Priority Data

Dec. 30, 2002 (KR) .................... 10-2002-0087462
Aug. 4, 2003 (KR) .................... 10-2003-0053898

(51) Int. Cl.
*H04Q 7/00* (2006.01)

(52) U.S. Cl. .................... 370/331; 370/328; 370/355

(58) Field of Classification Search ......... 455/436–444, 455/426.1–426.2, 552.1, 553.1, 434, 452.2, 455/560, 562; 370/331–337, 352–354, 328, 370/355, 342
See application file for complete search history.

(56) References Cited

U.S. PATENT DOCUMENTS 7,133,385 B2 * 11/2006 Lohtia et al. .............. 370/331

* cited by examiner

*Primary Examiner*—Lester G. Kincaid
*Assistant Examiner*—Sayed T Zewari
(74) *Attorney, Agent, or Firm*—Lahive & Cockfield, LLP; EuiHoon Lee, Esq.

(57) ABSTRACT

The present invention relates to a method and system for preventing a call drop by limiting a search time of a 1X system while in traffic with a 1xEV-DO system. The system comprises: a hybrid access terminal, supporting both a 1xEV-DO system and a 1X system, for periodically switching over to the 1X system and receiving an overhead message while in traffic with the 1xEV-DO system, and switching back to the 1xEV-DO system upon receiving a prescribed overhead message a base station transceiver subsystem for exchanging a voice data or a packet data with the hybrid access terminal a mobile switching center for providing a communication path for the hybrid access terminal; and a packet data serving node connected to the 1xEV-DO controller for exchanging the packet data with the 1xEV-DO system.

23 Claims, 5 Drawing Sheets

METHOD AND SYSTEM FOR PREVENTING CALL DROP BY RESTRICTING OVERHEAD MESSAGE UPDATED IN 1X SYSTEM DURING 1XEV-DO TRAFFIC STATE

FIELD OF THE INVENTION

The present invention relates to a method and a system for preventing a call drop by restricting a number of overhead messages updated by a hybrid access terminal (HAT) switched in to a 1X mode during a 1xEX-DO traffic state, and more particularly to a method and a system capable of specifying overhead messages of the 1X system, which are updated by the hybrid access terminal in traffic with a 1xEX-DO system in a predetermined period of time, and capable of preventing the call drop of the hybrid access terminal from the 1xEV-DO system by allowing the hybrid access terminal to automatically return to a 1xEV-DO mode if the hybrid access terminal receives only the overhead messages having specified type and number.

DESCRIPTION OF THE PRIOR ART

Mobile communication systems have been greatly advanced through $1^{st}$ generation analog-type advanced mobile phone systems (AMPS) and $2^{nd}$ generation cellular/personal communication service (PCS) systems. Recently, international mobile telecommunication-2000 (IMT-2000) systems have been developed and widely used as $3^{rd}$ generation high-rate data communication systems.

The 3GPP2 ($3^{rd}$ generation partnership project2), which is a collaborative international standardization group, offers standards of a CDMA IMT-2000 system for the IMT-2000 system in order to provide multimedia mobile communication services. According to the above standards, a high rate packet data system based on HDR (high data rate) proposed by Qualcom Incorporated has been decided as an international standard high rate packet data system called "1xEV (evolution)". A CDMA 2000 1xEV-DO (data optimized or data only) system is upgraded from a CDMA 2000 1X system and is designed to transmit only data.

In the following description, the CDMA 2000 1X system is simply referred to as "1X system" and the CDMA 2000 1xEV-DO system is simply referred to as "1xEV-DO system" for the convenience of explanation.

The 1X system utilizes both circuit networks and packet networks and provides high-rate data services with a maximum transmission rate of 307.2 Kbps. On the contrary, the 1xEV-DO system is dedicated for packet data and provides high-rate packet data services with a maximum transmission rate of 2.4 Mbps.

Currently, the 1xEV-DO system has been used together with the conventional 1X system. That is, both 1xEV-DO system and conventional 1X system are installed in one wireless base station or a base station controller even though they are separately operated from each other. In other words, a transceiver of the wireless base station includes a channel card for the 1xEV-DO system and a channel card for the 1X system, respectively. In addition, the base station controller includes a data processing board for processing packet data transmitted from the 1xEV-DO system and a data processing board for processing data transmitted from the 1X system, respectively.

High-rate data are transmitted to a mobile communication terminal from a mobile communication system, such as the wireless base station or the base station controller, through the 1xEV-DO system. In addition, voice signals or low-rate data are transmitted to the communication terminal through the 1X system.

A hybrid access terminal capable of receiving communication services transmitted from the mobile communication system having both 1xEV-DO system and 1X system may periodically monitor each of the 1xEV-DO and 1X systems in a predetermined period of time. That is, the hybrid access terminal periodically and alternately searches the 1xEV-DO and 1X systems in an idle mode thereof and periodically searches the 1X system when the hybrid access terminal is in traffic with the 1xEV-DO system.

Particularly, the hybrid access terminal in traffic with the 1xEV-DO system periodically accesses to the 1X system and updates system resources, such as system messages and access messages, in order to respond to low-data call signals, such as voice call-accepted signals and short messages, which may be transmitted to the hybrid access terminal from the 1X system.

However, the hybrid access terminal must stay in the 1X system until the system resources have been completely updated whenever the hybrid access terminal periodically accesses to the 1X system even if the hybrid access terminal is in traffic with the 1xEV-DO system.

In addition, the 1xEV-DO system may perform a call drop operation if the 1xEV-DO system does not receive a signal from the hybrid access terminal within a predetermined period of time (for example, 5.12 seconds) when the hybrid access terminal is in traffic with the 1xEV-DO system. That is, regardless of reasons thereof, if the 1xEV-DO system detects no signal from the hybrid access terminal within the predetermined period of time, the 1xEV-DO system performs the call drop operation with respect to the hybrid access terminal in order to efficiently utilize the system resources.

However, currently used 1xEV-DO systems have structures, which do not provide a user with reasons for the call drop operation. In other words, the 1xEV-DO system does not provide the user with information allowing the user to find a precise reason for the call drop operation, even though the call drop operation may happen in various situations, such as when the hybrid access terminal making a call-connection with the 1xEV-DO system is shifted into a wave shadow zone, when a communication system malfunctions, or when the hybrid access terminal is switched into the 1X system.

SUMMARY OF THE INVENTION

Therefore, the present invention has been made in view of the above-mentioned problems, and it is an object of the present invention to provide a method and a system capable of specifying overhead messages of the 1X system, which are updated by the hybrid access terminal in traffic with a 1xEX-DO system in a predetermined period of time, and capable of preventing the call drop of the hybrid access terminal from the 1xEV-DO system by allowing the hybrid access terminal to automatically return to a 1xEV-DO mode if the hybrid access terminal receives only the overhead messages having specified type and number.

In order to accomplish this object, according to an aspect of the present invention, there is provided a system for preventing a call drop between a 1xEV-DO (Evolution-Data Optimized) system and a hybrid access terminal in traffic with the 1xEV-DO system by restricting overhead messages, the system comprising: the hybrid access terminal operated in the 1X mode in relation to a 1X system for receiving a voice signal transmission service or a low-rate data transmission service from the 1X system and in the 1xEV-DO mode in relation to the 1xEV-DO system for receiving a high-rate data transmission service from the 1xEV-DO system, the hybrid access terminal being periodically switched into the 1X mode in traffic with the 1xEV-DO system so as to receive the overhead messages and returning to the 1xEV-DO mode if predetermined essential overhead messages are received; a base station transceiver subsystem including a 1xEV-DO access network transceiver for transmitting/receiving packet data to/from the hybrid access terminal and a 1X transceiver for transmitting/receiving voice or data to/from the hybrid access terminal; a base station controller including a 1xEV-DO access network controller for controlling a packet data transmission service of the 1xEV-DO access network transceiver and a 1X controller for controlling a transmission service of the 1X transceiver; and a packet data serving node (PDSN) connected to the 1xEV-DO access network controller so as to transmit/receive the packet data to/from the 1xEV-DO system.

In order to accomplish this object, according to another aspect of the present invention, there is provided a method for preventing a call drop between a 1xEV-DO (Evolution-Data Optimized) system and a hybrid access terminal in traffic with the 1xEV-DO system by restricting overhead messages, the method comprising the steps of: (a) sequentially initializing the 1X mode and a 1xEV-DO mode of the hybrid access terminal such that the hybrid access terminal stays in an idle state; (b) performing dual monitoring with respect to the 1X mode and the 1xEV-DO mode by using the hybrid access terminal in a state that the hybrid access terminal stays in the idle state; (c) allowing the hybrid access terminal to enter into a traffic state of the 1xEV-DO mode such that a connection and a session are established between the hybrid access terminal and the EV-DO system, thereby enabling the hybrid access terminal to transmit/receive packet data to/from the EV-DO system; (d) switching the hybrid access terminal into the 1x mode if a predetermined monitoring time lapses; (e) switching the hybrid access terminal into the 1x mode and allowing the hybrid access terminal to receive the overhead messages; and (f) allowing the hybrid access terminal to return to the 1xEV-DO mode if the hybrid access terminal receives all predetermined essential overhead messages.

In order to accomplish this object, according to still another aspect of the present invention, there is provided a hybrid access terminal which returns to a 1xEV-DO mode if predetermined conditions are satisfied by checking overhead messages received therein after being switched into a 1X mode, the hybrid access terminal comprising: a timer repeatedly measuring a monitoring time in order to perform dual monitoring between a 1xEV-DO system and a 1X system; a searcher module for tracking and converting frequency so as to perform the switching of the hybrid access terminal between the 1X mode and the 1xEV-DO mode in hardware, and receiving an overhead message; and a finger module for demodulating the overhead message received through the searcher module; and an MSM (mobile station modem) chip for controlling the switching through software, controlling transmission/receiving of data between the hybrid access terminal and the 1X system and the 1xEV-DO system, and controlling the hybrid access terminal in such a manner that the hybrid access terminal returns to the 1xEV-DO mode if a predetermined essential overhead messages are received when the hybrid access terminal has been switched into the 1X mode.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in detail to the preferred embodiments of the present invention.

In the following description of the present invention, a detailed description of known functions and configurations incorporated herein will be omitted when it may make the subject matter of the present invention rather unclear.

Figure 1:
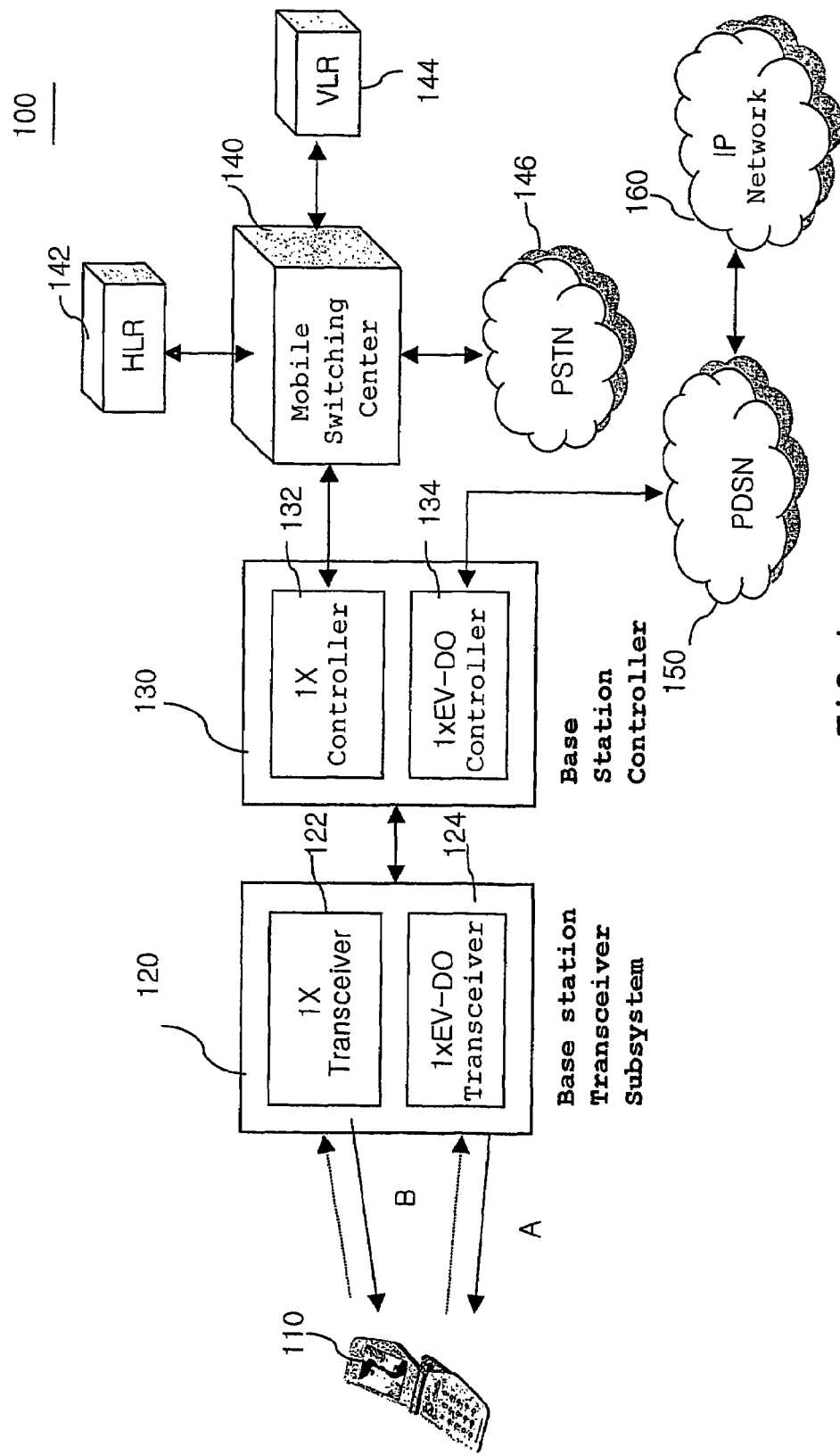
FIG. 1 is a schematic block view showing a system for reducing a call drop by restricting overhead messages updated by a hybrid access terminal in a 1X mode according to an exemplary embodiment of the present invention.

FIG. 1 is a schematic block view showing a system for reducing a call drop by restricting overhead messages updated by a hybrid access terminal 110 in a 1X mode according to an exemplary embodiment of the present invention.

As shown in FIG. 1, the system 100 of the present invention includes both 1xEV-DO system and 1X system. That is, the system 100 has the 1X system making communication with a hybrid access terminal 110 and consisting of a 1X transceiver 122, a 1X controller 132, and a mobile switching center (MSC) 140 in order to transmit voice and data. In addition, the system 100 has the 1xEV-DO system making communication with the hybrid access terminal 110 and consisting of a 1xEV-DO access network transceiver subsystem (ANTS) 124, a 1xEV-DO access network controller (ANC) 134, a packet data serving node (hereinafter, simply referred to as PDSN) 150, and an IP (internet protocol) network in order to transmit data only.

The hybrid access terminal 110 is divided into two parts so that the hybrid access terminal 110 can receive a voice service and a low-rate data service from the 1X system and receive a high-rate data service from the 1xEV-DO system, separately. The hybrid access terminal 110 is switched into a 1X mode when the hybrid access terminal 110 is in an idle state in such a manner that the hybrid access terminal 110 can make communication with the 1X system. In this state, the hybrid access terminal 110 is periodically switched into a 1xEV-DO mode in a predetermined period of time so as to check whether or not data are received through the 1xEV-DO system and returns to the 1X mode. According to the exemplary embodiment of the present invention, the hybrid access terminal 110 in traffic with the 1xEV-DO system is switched into the 1X mode (which is called "switch") and is again switched into the 1xEV-DO mode (which is called "return").

The switch and return functions between the 1xEV-DO system and the 1X system are controlled by means of software stored in a mobile station modem (MSM) chip, which is a kind of a baseband modem chip accommodated in the hybrid access terminal 110. In addition, the switch and return functions are achieved by tracking frequencies of each network using a searcher connected to the MSM chip. That is, when the hybrid access terminal 110 is switched from the 1xEV-DO mode into the 1X mode, a searcher module tracks the frequency of the 1X system under the control of the MSM chip. In addition, when the hybrid access terminal 110 returns to the 1xEV-DO mode from the 1X mode, the searcher module tracks the frequency of the 1xEV-DO system.

When the hybrid access terminal 110 receives data from the 1xEV-DO system in the 1xEV-DO mode, a great amount of data may be received in the hybrid access terminal 110 since the hybrid access terminal 110 receives high-rate data in the 1xEV-DO mode. Accordingly, in a case of a forward link for transmitting data from an access network (AN) to the hybrid access terminal 110, channels divided through a CDMA (code division multiple access) method may transmit data through time slots, which are divided through a TDM (time division multiplexing) method. On the contrary, in a case of a reverse link for transmitting data from the hybrid access terminal 110 to the 1xEV-DO access network transceiver subsystem 124 and the 1xEV-DO access network controller 134, data are transmitted through a conventional CDMA method for a plurality of subscribers.

In addition, the hybrid access terminal 110 receiving data in traffic with the 1xEV-DO mode is periodically switched into the 1X mode in a predetermined period of time so as to check whether or not signals, such as voice signals, are received through the 1X system and returns to the 1xEV-DO mode. At this time, the hybrid access terminal 110, which has been switched into the 1X mode, receives and updates overhead messages transferred from the 1X system in order to perform a voice call and a location register of the 1X system.

Herein, the overhead messages, which are received and updated by the hybrid access terminal 110 in the 1X mode, includes a system parameter message, an access parameter message, an extended system parameter message, a neighbor list parameter message, a channel list parameter message, and so on.

The system parameter message includes an NID (network ID), an SCI (slot cycle index), a packet zone ID, and so on, which are required for receiving a call. The access parameter message includes information required by the hybrid access terminal 110 in order to access to the 1X system from the 1xEV-DO system. The extended system parameter message includes system parameters, which are added when an IS (interim standard)-95B system has been upgraded to the 1X system. Also, the neighbor list parameter message includes information about cell IDs of neighbor cells adjacent to a cell, in which the hybrid access terminal 110 is located. The channel list parameter message includes information about frequency channels allowing the hybrid access terminal 110 to transmit/receive data or voices after the hybrid access terminal 110 sets up a call.

That is, the hybrid access terminal 110, which has been switched from the 1xEV-DO mode into the 1X mode, stays in the 1X mode until updating all overhead messages described above. If the hybrid access terminal 110 does not respond to a pilot channel within a predetermined time (for example, 5.12 seconds), the 1xEV-DO system in traffic with the hybrid access terminal 110, drops a call set by the 1xEV-DO system and the hybrid access terminal 110.

Therefore, according to the spirit of the present invention, if the hybrid access terminal 110 receives only a predetermined minimum of overhead messages required in order to respond to a call request of the 1X system without receiving all overhead messages, the hybrid access terminal 110 can return to the 1xEV-DO mode. Accordingly, the hybrid access terminal prevents the call drop performed by the 1xEV-DO system. In other words, the hybrid access terminal 110 stores information about essential overhead messages required for returning to the 1xEV-DO mode from the "switch" state in which the hybrid access terminal 110 is switched into the 1X mode in an internal memory thereof.

In detail, the hybrid access terminal 110 forcefully returns to the 1xEV-DO mode from the 1X mode through the MSM chip, the searcher module, and the finger module accommodated in the hybrid access terminal 110. The MSM chip has functions of processing and controlling various operations, which occur in the hybrid access terminal 110. Also, the MSM chip controls various data, which are transmitted/received or inputted/outputted between users, which input voices thereof or values of key buttons, and the hybrid access terminal 110, the 1xEV-DO system, or the 1X system. In addition, the MSM chip includes a central processing unit (CPU), and a vocoder for coding voices.

Accordingly, when the hybrid access terminal 110 is in traffic with the 1xEV-DO system, the MSM chip performs a monitoring operation with respect to the 1X system with periodic time interval by using software therein. Such a monitoring operation is achieved through the searcher module. That is, the searcher module performs the monitoring operation by tracking frequency of the 1X system with a predetermined time interval under the control of the MSM chip.

Meanwhile, overhead messages received when the searcher module monitors the 1x system are delivered to the MSM chip. The MSM chip sends the overhead messages received from the searcher module to the finger module. The finger module receiving the overhead messages from the MSM chip demodulates the overhead messages by using a CDMA demodulation method. Also, a TDMA demodulation method is used for modulation data or modulation signals received when the searcher module monitors the 1xEV-DO system.

The MSM chip, which receives the demodulated overhead messages from the finger module, determines whether or not a list of essential overhead messages stored therein is received. The list of the essential overhead messages according to an exemplary embodiment of the present invention includes the system parameter message and the access system parameter message, which are required in order to respond to a call of the 1X system, from among the various overhead messages described above. One or more overhead messages from among overhead messages except for the essential overhead messages can be added to the list of the essential overhead messages.

Meanwhile, if the MEM chip determines that all predetermined essential overhead messages are received, the MEM chip directly returns to the 1xEV-DO system from the 1X system regardless of receiving the overhead messages except for the essential overhead messages, thereby preventing the call drop between the hybrid access terminal 110 and the 1xEV-DO system.

Herein, after the hybrid access terminal 110 is switched into the 1X mode, the hybrid access terminal 110 stores overhead messages, which are received in and demodulated by the hybrid access terminal 110, in a memory thereof. Accordingly, when the hybrid access terminal 110 returns to the 1xEV-DO mode so as to operate in traffic with the 1xEV-DO system and is switched into the 1X system again after a predetermined time (for example 5.12 seconds) lapses, the hybrid access terminal 110 can re-use the overhead messages obtained through a previous 1X system search operation. In other words, if the hybrid access terminal 110 receives only remaining overhead messages except for the essential overhead messages which are obtained through the previous 1X system search operation, the hybrid access terminal 110 can perform a call process in the 1X system.

Overhead messages to be updated by the hybrid access terminal 110 are restricted within a predetermined range of the essential overhead messages in the same manner as described above, thereby allowing the hybrid access terminal 110 to stay in the 1X system in a short period of time as possible. Accordingly, it is possible to reduce the number of call drop states and the possibility of the call drop between the hybrid access terminal 110 and the 1xEV-DO system.

The 1X transceiver 122 and the 1xEV-DO access network transceiver subsystem 124 form a base station transceiver subsystem (BTS) 120 so as to provide mobile communication services including voice and data to the hybrid access terminal 110 through an air interface. That is, the base station transceiver subsystem 120 transmits voice or data to the hybrid access terminal 110 through the 1X transceiver 122 and transmits only packet data to the hybrid access terminal 110 through the 1xEV-DO access network transceiver subsystem 124.

The 1X controller 132 and the 1xEV-DO access network controller 134 form a base station controller (BSC) 130 for controlling an operation of the base station transceiver subsystem 120. That is, the 1X controller 132 for controlling transmission of voice or data sends voice and/or data transmitted from the 1X transceiver 122 to the mobile switching center 140 and the 1xEV-DO access network controller 134 sends data transmitted from the 1xEV-DO access network transceiver subsystem 124 to the PDSN 150.

The mobile switching center 140 physically connects a plurality of 1X controllers 132 to another mobile switching center or to a public switched telephone network (PSTN) 146 so as to provide a communication access route of the 1X system with respect to a communication call transmitted from the hybrid access terminal 110.

In addition, the mobile switching center 140 processes call signals of subscribers by obtaining profile information of the hybrid access terminal 110 from a home location register (hereinafter, simply referred to as "HLR") 132, which is a database storing information of hybrid access terminals registered in the mobile switching center 140, and a visitor location register (hereinafter, simply referred to as "VLR") 134, which is a database storing information of hybrid access terminals 110 located in a region of the VLR 134. Herein, profile information includes a mobile identification numbers (MIN), an electrical serial number (ESN), and supplementary services.

The 1xEV-DO system, which is a high-rate packet data system, is connected to the PDSN 150 based on TCP/IP so as to transmit/receive various data in the form of IP packets to/from an IP network 160. In addition, the 1xEV-DO system receives packet data from the IP network 160 and transmits the packet data to the hybrid access terminal 110 through time slots, which are divided through a TDM method. In addition, the 1xEV-DO system receives CDMA data, which are modulated through a CDMA method, from the hybrid access terminal 110, creates packet data by using the CDMA data, and transmits the packet data to the PDSN 150.

In a case of a forward link, the 1xEV-DO system transmits data with maximum power thereof without using a power control of a wireless base station while providing only a hard handoff function. However, in a case of a reverse link, the power control is carried out in each terminal while providing a soft handoff function as well as the hard handoff function.

Figure 2A:
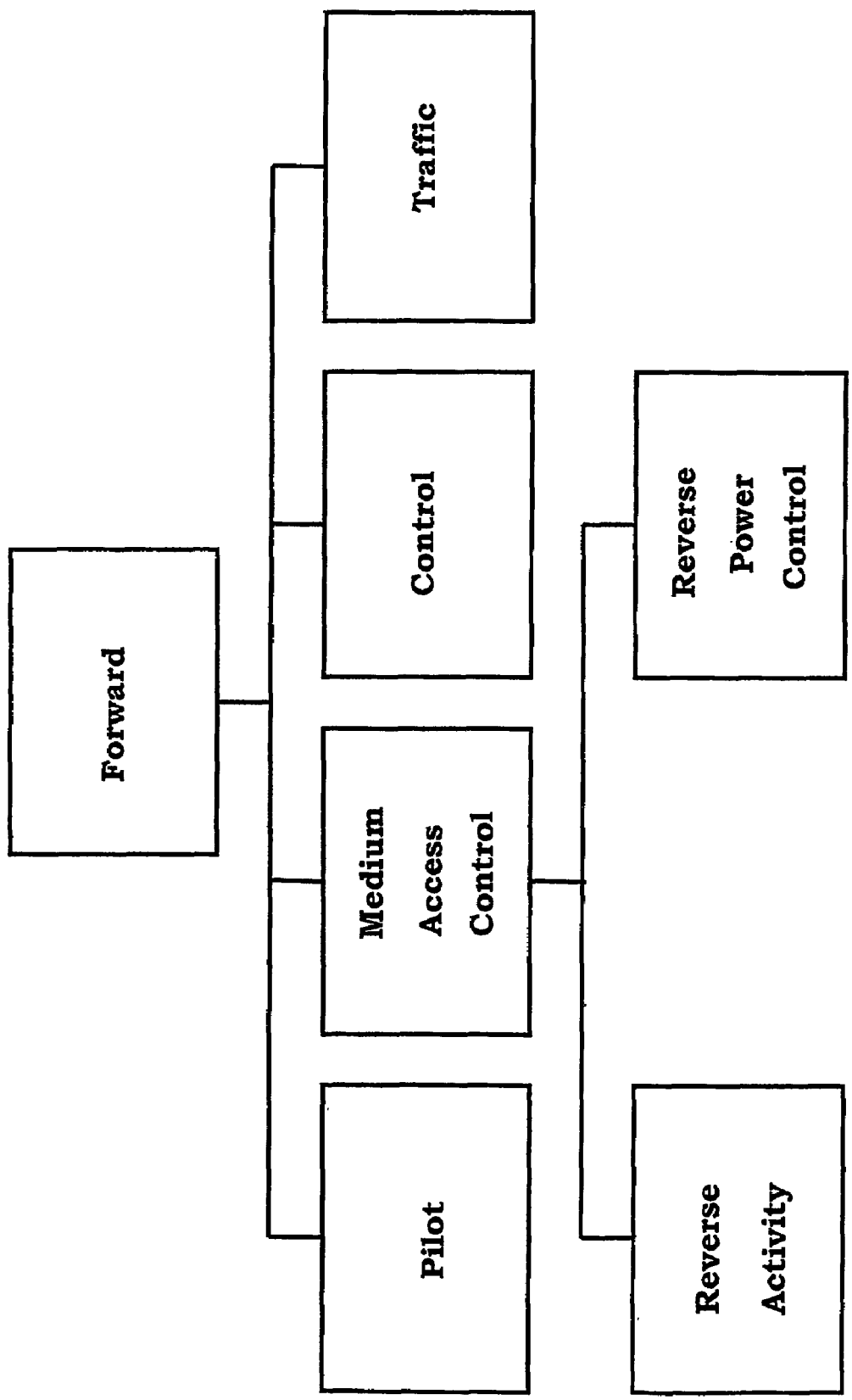
FIGS. 2A and 2B are block views showing a channel structure of a forward link for transmitting data to a hybrid access terminal through a 1xEV-DO access network transceiver subsystem.
Figure 2B:
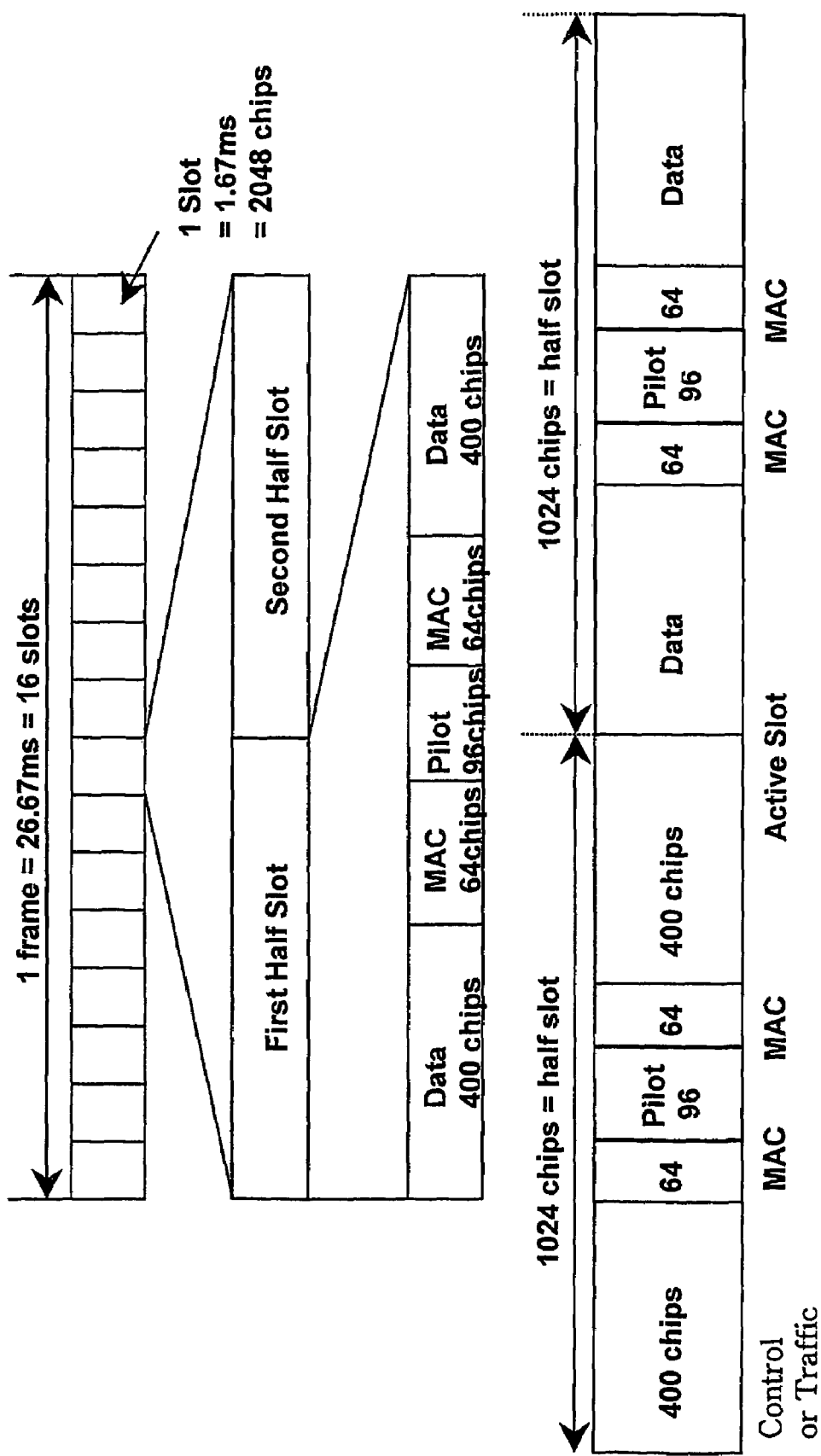

FIGS. 2A and 2B are block views showing a channel structure of the forward link for transmitting data to the hybrid access terminal 110 through a 1xEV-DO access network transceiver subsystem.

As shown in FIG. 2A, the forward link includes a pilot channel, a medium access control (MAC) channel, a control channel, and a traffic channel. The pilot channel is provided to transmit a pilot signal for allowing the 1xEV-DO system to track the hybrid access terminal 110. The hybrid access terminal 110 receives at least one pilot signal through the pilot channel and accesses to a wireless base station, which has transmitted a pilot signal having greatest intensity. In addition, the pilot channel is used as a reference for coherent detection of the wireless base station having the 1xEV-DO system by means of the hybrid access terminal 110.

The MAC channel is mainly used for controlling the reverse link and includes a reverse activity (RA) channel and a reverse power control (RPC) channel. Herein, the RA channel is used for determining a transmission rate of the reverse link. In addition, the RA channel may be used for requesting the hybrid access terminal 110 to decrease the transmission rate when channels of the reverse link are saturated. In addition, the RPC channel is used for controlling transmission power when the hybrid access terminal 110 transmits signals or data through the reverse link.

The control channel is used for transmitting a broadcast message from the 1xEV-DO system to the hybrid access terminal 110 or for transmitting a direct message in order to directly control a specific hybrid access terminal. The traffic channel is used when the 1xEV-DO system transmits only packet data to the hybrid access terminal 110.

Hereinafter, a time slot structure and a data structure in the forward link will be described with reference to FIG. 2B. Firstly, the forward link includes 16 time slots per one frame having a time interval about 26.67 ms. In addition, each of the time slots includes 1024 chips in a first half slot and 1024 chips in a second half slot, that is, total 2048 chips. In addition, a time interval of 1.67 ms is allotted to each time slot.

In detail, each of the first half slot and second half slot includes 400 chips of a data slot, 64 chips of a MAC slot, 96 chips of a pilot slot, 64 chips of a MAC slot and 400 chips of a data slot.

Figure 3:
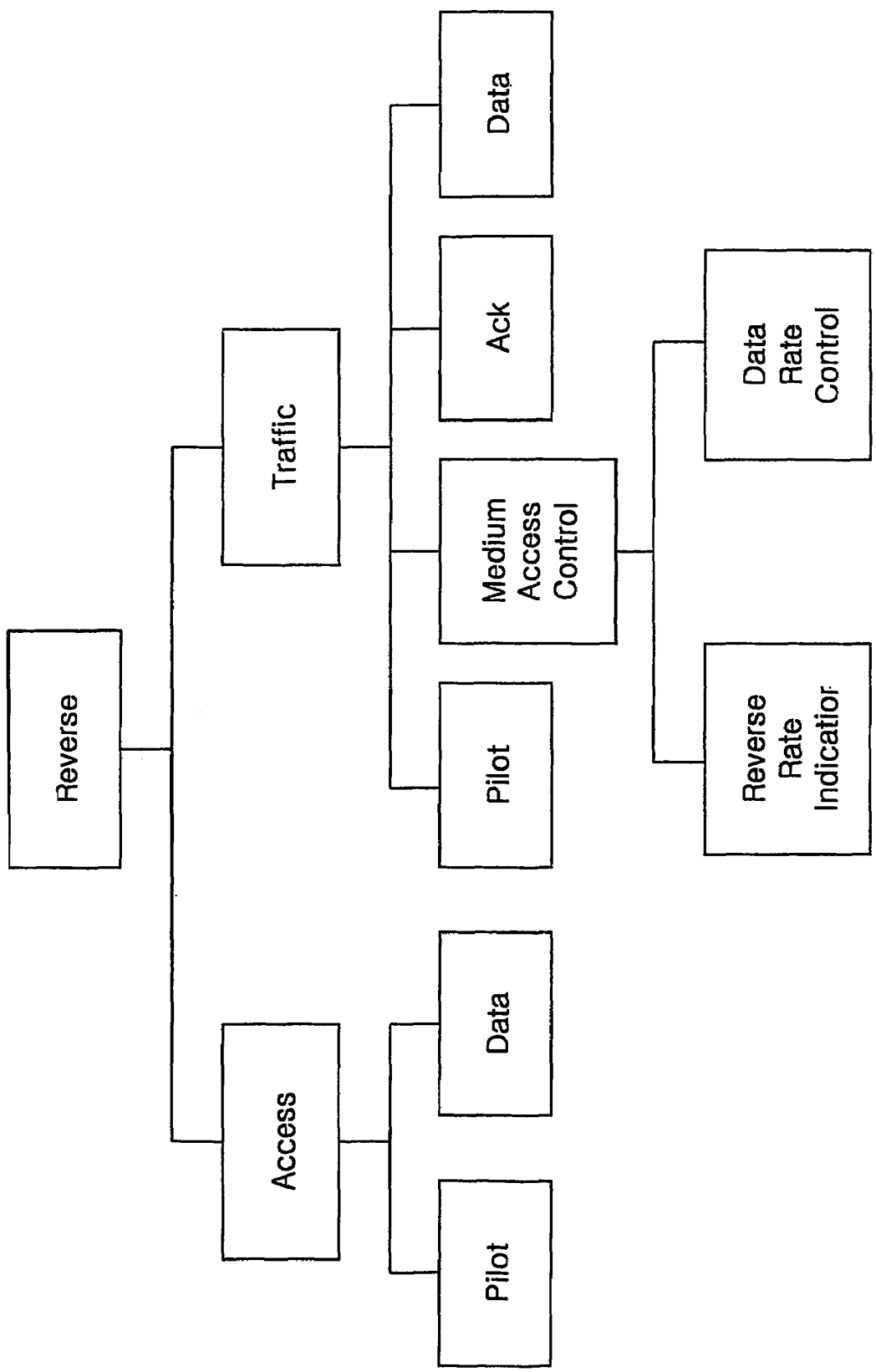
FIG. 3 is a block view showing a channel structure of a reverse link for transmitting data to a 1xEV-DO system from a hybrid access terminal.

FIG. 3 is a block view showing a channel structure of the reverse link for transmitting data to the 1xEV-DO system from the hybrid access terminal 110.

The reverse link shown in FIG. 3 may use a CDMA method in the same manner as the 1X system and mainly include an access channel and a traffic channel. The access channel has a pilot channel and a data channel and the traffic channel has a pilot channel, MAC channel, an Ack channel, and a data channel. Herein, the MAC channel is again divided into a reverse rate indicator (RRI) channel and a data rate control (DRC) channel.

The access channel is used for transmitting an origination connection_request message, and a registration route_update message. The access channel has a low transmission rate of 9.6 kbps for stability of a wireless channel.

Similar to the pilot channel in the forward link shown in FIG. 2A, the pilot channel shown in FIG. 3 is used as a reference for coherent detection of the wireless base station having the 1xEV-DO system by means of the hybrid access terminal 110. The data channel is used for transmitting data required for the hybrid access terminal 110 to access to the 1xEV-DO system.

The traffic channel is used when the hybrid access terminal 110 transmits packet data to the 1xEV-DO system. The traffic channel provides various data transmission rates depending on wireless communication environment.

The pilot channel performs a function identical to the function of the pilot channel, which has been described with reference to the access channel. The MAC channel is used for controlling a data transmission rate of the traffic channel, so the MAC channel continuously exists while the hybrid access terminal 110 is being connected to the 1xEV-DO system. The RRI channel of the MAC channel is used for representing information of the data transmission rate of the traffic channel when the hybrid access terminal 110 transmits data through the traffic channel. An RRI value is displayed in the hybrid access terminal 110.

In addition, the DRC channel determines a data rate, which can be demodulated, depending on channel environment of the forward link and notifies the base station of the data rate. That is, the 1xEV-DO access network transceiver subsystem 124 transmits packet data to the hybrid access terminal 110 by using time slots of the forward link. At this time, a basis for determining the transmission rate of packet data is the DRC cover value transmitted by the hybrid access terminal 110. In order to determine the DRC cover value, the hybrid access terminal 110 measures a C/I (carrier to interference) value transmitted from the 1xEV-DO access network transceiver subsystem 124 and determines the DCR cover value for the maximum transmission rate.

The Ack channel is used for transmitting a response signal for data received in the hybrid access terminal 110 through the forward link in a time slot unit. The Ack channel is adaptable for data having a short length and corresponds to a half of a length of a time slot so as to reduce interference.

The data channel is used when the hybrid access terminal 110 transfers only the packet data similarly to the data channel of the access channel.

Meanwhile, a packet, which is a basic transmission unit of the traffic channel, has a length of 26.66 ms, and a transmission bit rate thereof is varied depending on sizes of the packet. The pilot channel, traffic channel, DRC channel and the Ack channel are discriminated from each other by using a Walsh Code, which is an orthogonal code.

Figure 4:
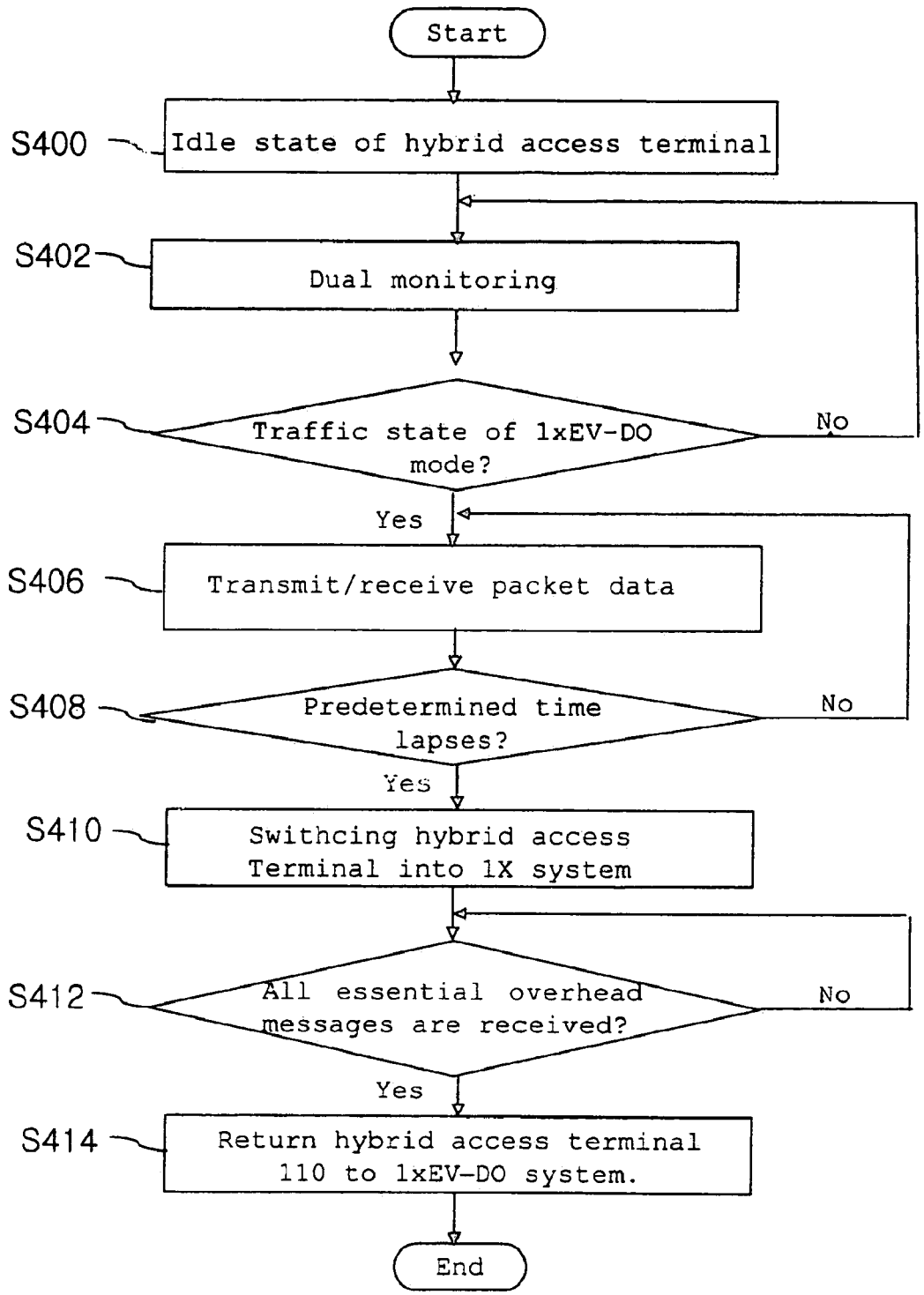
FIG. 4 is a flow chart showing a procedure of reducing a call drop by restricting overhead messages updated by a hybrid access terminal switched into a 1X mode during a 1xEV-DO traffic state according to an exemplary embodiment of the present invention.

FIG. 4 is a flow chart showing a procedure of reducing the call drop by restricting overhead messages updated by the hybrid access terminal 110 switched into the 1X mode during the 1xEV-DO traffic state according to an exemplary embodiment of the present invention.

When the hybrid access terminal 110 is powered on by a user, the hybrid access terminal 110 receives the pilot signals from the 1X controller 132 and the 1X transceiver 122 of the 1X system so that the 1X mode is initialized and the hybrid access terminal 110 is maintained in an idle state. In addition, the hybrid access terminal 110 initializes the 1xEV-DO mode by using a system parameter message obtained when initializing the 1X mode, and the pilot signals transmitted from the 1xEV-DO access network controller 134 and the 1xEV-DO access network transceiver subsystem 124, and then, the hybrid access terminal 110 is maintained in the idle state (S400).

The hybrid access terminal 110 initializing both 1X mode and 1xEV-DO mode performs a dual monitoring between the 1X mode and the 1xEV-DO mode (S402).

Meanwhile, when the hybrid access terminal 110 performs the dual monitoring with respect to both 1X system and 1xEV-DO system in the idle state, if data are transmitted to the hybrid access terminal 110 from the 1xEV-DO access network transceiver subsystem 124 or the user requests data to the 1xEV-DO system by operating key buttons of the hybrid access terminal 110, it is checked whether or not the 1xEV-DO mode is activated and the hybrid access terminal 110 is entered into a traffic state for receiving/transmitting data (S404). The hybrid access terminal 110 must establish a connection and a session with the 1xEV-DO access network transceiver subsystem 124 in such a manner that the hybrid access terminal 110 enters into the traffic state and transmit/receive data to/from the 1xEV-DO access network transceiver subsystem 124.

If the hybrid access terminal 110 enters into the traffic state of the 1xEV-DO mode in step S404, the hybrid access terminal 110 transmits/receives packet data to/from the 1xEV-DO system (S406).

While transmitting/receiving packet data into/from the 1xEV-DO system in the traffic state of step 406, the hybrid access terminal 110 checks whether or not a predetermined monitoring time (for example, 5.12 seconds) lapses by using a timer accommodated in the hybrid access terminal 110 in order to periodically search the 1X system (S408).

If the hybrid access terminal 110 determines that the predetermined monitoring time lapses in step S408, the hybrid access terminal 110 is switched into the 1X mode (S410). In detail, the hybrid access terminal 110 is switched into the 1X mode by operations of the MSM chip and the searcher module accommodated therein. In this state, the hybrid access terminal 110 receives and demodulates overhead messages by searching the 1X system in such a manner that the hybrid access terminal 110 can respond to a call from the 1X system (S410).

The MSM chip of the hybrid access terminal 110, which receives the overhead messages in step S410, continuously checks whether or not all predetermined essential overhead messages are received (S412).

If the hybrid access terminal 110 determines that all predetermined essential overhead messages have been received in step 412, the hybrid access terminal 110 does not receive other overhead messages and returns to the 1xEV-DO mode (S414). Surely, the hybrid access terminal 110, which transmits/receives packet data by returning to the 1xEV-DO mode, returns to step 410 again after the predetermined monitoring time lapses so as to continuously repeat steps 410 to 414.

According to one embodiment of the present invention, it is possible to solve a problem of a call drop, which occur between the hybrid access terminal 110 and the 1xEV-DO system while the hybrid access terminal 110 is receiving overhead messages for a call response or a location register of the 1X system in a traffic state for making data communication with the 1xEV-DO system, without using resources of the 1X system or the 1xEV-DO system While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICATION

As can be seen from the foregoing, a call drop problem conventionally happens due to various kinds of reasons when a hybrid access terminal searches a 1X system in a traffic state between the hybrid access terminal and a 1xEV-DO system. However, according to the present invention, the hybrid access terminal can rapidly return to the 1xEV-DO mode as possible by restricting the sorts or the number of overhead messages_to be updated by the hybrid access terminal in the 1X mode, so that it is possible to solve the call drop problem.

In addition, according to the present invention, the hybrid access terminal itself checks whether or not a predetermined essential overhead messages are received and returns to the 1xEV-DO system without using resources of the 1X system and the 1xEV-DO system, thereby preventing waste of communication resources and the 1xEV-DO system from being subject to overload.

What is claimed:

1. A system for preventing a call drop between a hybrid access terminal and a CDMA 2000 1xEV-DO (Evolution-Data Optimized) system by restricting overhead messages when the hybrid access terminal is periodically switched into a CDMA 2000 1X mode in traffic with the 1xEV-DO system, the system comprising:

the hybrid access terminal operated in the 1X mode in relation to a 1X system for receiving a voice signal transmission service or a low-rate data transmission service from the 1X system and in the 1xEV-DO mode in relation to the 1xEV-DO system for receiving a high-rate data transmission service from the 1xEV-DO system, the hybrid access terminal being periodically switched into the 1X mode in traffic with the 1xEV-DO system so as to receive the overhead messages and returning to the 1xEV-DO mode if predetermined essential overhead messages are received;

a base station transceiver subsystem including a 1xEV-DO access network transceiver for transmitting/receiving packet data to/from the hybrid access terminal and a 1X transceiver for transmitting/receiving voice or data to/from the hybrid access terminal;

a base station controller including a 1xEV-DO access network controller for controlling a packet data transmission service of the 1xEV-DO access network transceiver and a 1X controller for controlling a transmission service of the 1X transceiver; and a packet data serving node (PDSN) connected to the 1xEV-DO access network controller so as to transmit/receive the packet data to/from the 1xEV-DO system.

2. The system as claimed in claim 1, wherein the overhead messages include a system parameter message, an access parameter message, an extended system parameter message, a neighbor list parameter message, and a channel list parameter message.

3. The system as claimed in claim 1 or 2, wherein the predetermined essential overhead messages include the system parameter message and the access parameter message.

4. The system as claimed in claim 3, wherein, when all overhead essential messages are received in the hybrid access terminal, the hybrid access terminal stops message receiving work and returns to the 1xEV-DO mode.

5. The system as claimed in claim 1, wherein the hybrid access terminal is set as the 1X mode in an idle state thereof in order to make communication with the 1X system and is periodically switched into the 1xEV-DO mode in a predetermined period of time so as to check whether or not data are received through the 1xEV-DO system and returns to the 1X mode.

6. The system as claimed in claim 1, wherein the hybrid access terminal receiving high-rate data from the 1xEV-DO system in the 1xEV-DO mode is periodically switched into the 1X mode in a predetermined period of time so as to check whether or not signals are received through the 1X system and returns to the 1xEV-DO mode.

7. The system as claimed in claim 1, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

8. The system as claimed in claim 7, wherein a hard handoff is carried out in case of the forward link by transmitting data with maximum power without performing power control, and a soft handoff is carried out in case of the reverse link while performing the power control with respect to each hybrid access terminal.

9. The system as claimed in claim 1, wherein the hybrid access terminal is switched from the 1xEV-DO mode into the 1X mode by tracking frequency of the 1X system using a searcher module under the control of a mobile station modem (MSM) chip.

10. The system as claimed in claim 7, wherein the forward link includes a pilot channel used for transmitting a pilot signal allowing the 1xEV-DO system to track the hybrid access terminal, a MAC (medium access control) channel used for controlling the reverse link, a control channel used for transmitting a broadcast message or a direct message for directly controlling a specific hybrid access terminal from the 1xEV-DO system to the hybrid access terminal, and a traffic channel used for transmitting only packet data from the 1xEV-DO system to the hybrid access terminal.

11. A method for preventing a call drop between a hybrid access terminal and a 1xEV-DO (Evolution-Data Optimized) system by restricting overhead messages when the hybrid access terminal in traffic with the 1xEV-DO system is periodically switched into a 1X mode, the method comprising the steps of:

(a) sequentially initializing the 1X mode and a 1xEV-DO mode of the hybrid access terminal such that the hybrid access terminal stays in an idle state;

(b) performing dual monitoring with respect to the 1X mode and the 1xEV-DO mode by using the hybrid access terminal in a state that the hybrid access terminal stays in the idle state;

(c) allowing the hybrid access terminal to enter into a traffic state of the 1xEV-DO mode such that a connection and a session are established between the hybrid access terminal and the EV-DO system, thereby enabling the hybrid access terminal to transmit/receive packet data to/from the EV-DO system;

(d) switching the hybrid access terminal into the 1x mode if a predetermined monitoring time lapses;

(e) switching the hybrid access terminal into the 1x mode and allowing the hybrid access terminal to receive the overhead messages; and (f) allowing the hybrid access terminal to return to the 1xEV-DO mode if the hybrid access terminal receives all predetermined essential overhead messages.

12. The method as claimed in claim 11, wherein, in step (a), the hybrid access terminal initializes the 1xEV-DO mode by using system parameters obtained when initializing the 1X mode.

13. The method as claimed in claim 11, wherein, in step (d), the predetermined monitoring time is 5.12 seconds, which is counted after the hybrid access terminal returns to the 1xEV-DO mode.

14. The method as claimed in claim 11, wherein, in step (d), switching the hybrid access terminal into the_1x mode is performed through a searcher module, which tracks frequencies used in the 1X system under a control of an MSM chip accommodated in the hybrid access terminal.

15. The method as claimed in claim 11, wherein, in step (e), the hybrid access terminal demodulates the received overhead messages to store the demodulated overhead messages in a predetermined memory.

16. The method as claimed in claim 11, wherein, in step (f), the essential overhead messages include a system parameter message and an access parameter message.

17. The method as claimed in claim 11, wherein, in step (f), an operation of allowing the hybrid access terminal to return to the 1xEV-DO mode is performed through a searcher module, which tracks frequencies used in the 1xEV-DO system under a control of an MSM chip accommodated in the hybrid access terminal.

18. The method as claimed in claim 11, wherein the hybrid access terminal uses the essential overhead messages received and stored during a previous search of the 1X system for a next search of the 1X system.

19. A hybrid access terminal which returns to a 1xEV-DO mode if predetermined conditions are satisfied by checking overhead messages received therein after being switched into a 1X mode, the hybrid access terminal comprising:
 a timer repeatedly measuring a monitoring time in order to perform dual monitoring between a 1xEV-DO system and a 1X system;
 a searcher module for tracking and converting frequency so as to perform the switching of the hybrid access terminal between the 1X mode and the 1xEV-DO mode in hardware, and receiving an overhead message;
 a finger module for demodulating the overhead message received through the searcher module; and
 an MSM (mobile station modem) chip for controlling the switching through software, controlling transmission/receiving of data between the hybrid access terminal and the 1X system and the 1xEV-DO system, and controlling the hybrid access terminal in such a manner that the hybrid access terminal returns to the 1xEV-DO mode if a predetermined essential overhead messages are received when the hybrid access terminal has been switched into the 1X mode.

20. The hybrid access terminal as claimed in claim 19, wherein the hybrid access terminal searches frequencies used in the 1X system or the 1xEV-DO system according to a predetermined monitoring period so as to be operated in the 1X mode or 1xEV-DO mode.

21. The hybrid access terminal as claimed in claim 19, wherein the hybrid access terminal demodulates the received essential overhead messages to store the demodulated essential overhead messages in a predetermined memory.

22. The hybrid access terminal as claimed in claim 19, wherein the hybrid access terminal uses the essential overhead messages received and stored during a previous search of the 1X system for a next search of the 1X system.

23. The hybrid access terminal as claimed in claim 19, wherein the hybrid access terminal, which stores the essential overhead messages, returns to a state allowing the hybrid access terminal to respond to a voice call from the 1X system or perform a location register in the 1X system if the hybrid access terminal receives remaining overhead messages.

* * * * *